Feb. 24, 1970   A. R. O'MALLEY   3,496,643
GONIOMETER

Filed Sept. 4, 1968   3 Sheets-Sheet 1

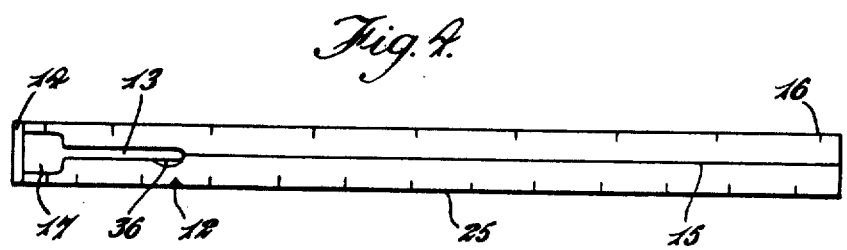
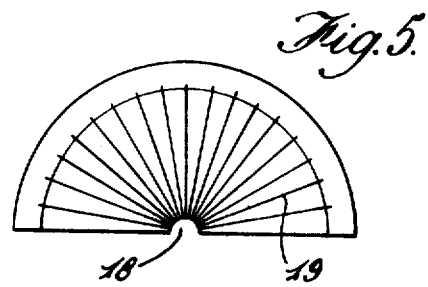
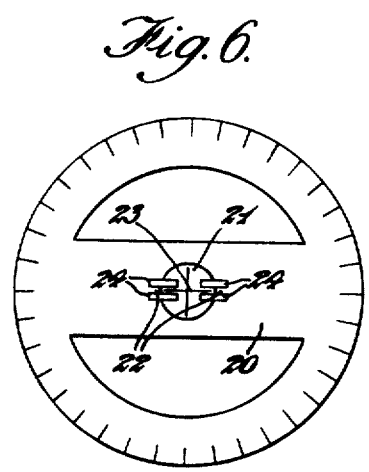
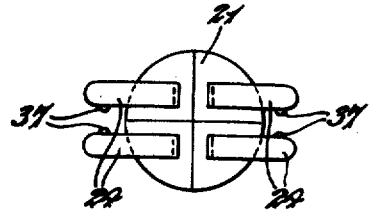

United States Patent Office 3,496,643
Patented Feb. 24, 1970

3,496,643
GONIOMETER
Arthur R. O'Malley, Dunwood Manor,
Romsey, Hampshire, England
Filed Sept. 4, 1968, Ser. No. 757,342
Int. Cl. B43l 13/00
U.S. Cl. 33—75         3 Claims

ABSTRACT OF THE DISCLOSURE

The invention provides a device for measuring angles in two mutually perpendicular planes comprising two protractors at a fixed or variable angle to one another and having a common center, and a ruler pivotable about the common center over the scales of one or both protractors with means for permanently or temporarily fastening the components together.

BACKGROUND OF INVENTION

Figure 1:
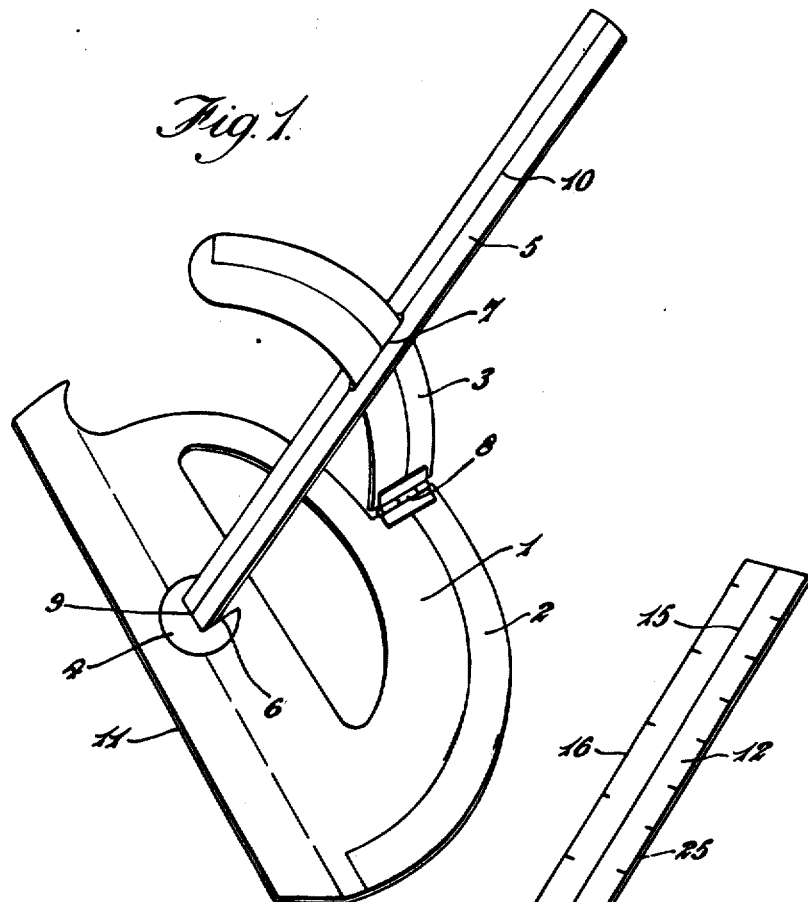

Flat circular, semicircular and quadrant-shaped graduated protractors for measuring angles in one plane have been used in schools for many years. They are generally made of transparent plastics or of metal. The principle of the theodolite for measuring angles in a vertical plane is also very well known, but such devices include a telescope and other complicated parts because of the accuracy required by surveyors.

The present invention seeks to provide a simple device that is inexpensive, that is easy to make and operate, that can be used by schoolchildren learning mathematics, and that facilitates in particular the comprehension of trigonometrical ratios such as sine, cosine and tangent.

SUMMARY OF INVENTION

The invention provides a device for measuring angles in two mutually perpendicular planes comprising two protractors at a fixed or variable angle to one another and having a common center, and a ruler pivotable about the common center over the scales of one or both protractors with means for permanently or temporarily fastening the components together.

In one embodiment of the invention one protractor is hinged to the other protractor so that the angle between them can be varied. Instead of being permanently hinged together, the two protractors can be provided with a tongue-and-slot device to enable them to be connected in such a manner that the angle between them can be varied.

According to another embodiment of the invention, one protractor is held perpendicular to the other protractor and the instrument is provided with means for rotating one protractor about the other protractor. The scale on the base of the instrument can suitably represent 90°, 180°, 270° or 360°. The other scale suitably represents a quadrant, i.e. 90°, or a semicircle, i.e. 180°. Preferably the numbering on each scale starts at the intersection of the two scales unless one scale is rotatable about the other scale in which case only one of the scales need be numbered from the intersection in order to achieve the same effect. The scales can if desired be numbered in both directions, e.g. from 0° to 90° and from 90° to 0°.

When the scale on the base measures 180° and the two protractors are fixed with respect to one another, the other protractor is preferably connected to the protractor scale at its center. The scale on the base is then desirably marked from 0° to 90° on each side of the other scale starting at the intersection of the protractors and in addition the scale on the base is marked from 0° to 180° from one end to the other. When the scale on the base represents 270° or 360° it is preferably marked in both directions, i.e. from 0° to 270° (or 360°) and from 270° (or 360°) to 0° and when the two protractors are fixed with respect to one another the numbering preferably starts at the intersection of the two protractors.

In one preferred embodiment of the invention one of the protractors is in the form of an arc, one end of the arc being connected to the other protractor and the other end being unattached.

Alternatively, if one of the protractors forms the base, the base being semicircular or circular in shape, the other protractor can take the form of an inset quadrant of a full quadrant which is hinged to the base. The arc, inset quadrant or full quadrant can either be formed by cutting out part of the base or it can be formed separately. When the scale on the base represents 90° or 270° the other scale may be formed from part of the base; when the scale on the base represents 180° or 360° it is desirable for the scale to be formed separately.

The ruler may be hinged to the instrument or rotatably held in a slot at the common center of the two protractors. Preferably such a slot will be cut out of a swivel device or turntable, and, when one scale of the instrument is on an arc, inset quadrant or full quadrant, the ruler is provided with a slit through which the scale can pass.

Preferably the ruler has a central line on which a scale is marked off in units of length, e.g. inches or centimetres, from the end of the ruler held in the slot. In this case the end of the ruler held in the slot should be shaped e.g. in the form of a wedge or a curve so that the central line can be rotated about the common center. The slot can be shaped complementarily. This enables distances from this point, e.g. the lengths of the sides of triangles, to be measured directly. If desired one or both of the edges of the ruler can also be calibrated in units of length.

In another preferred embodiment of the invention one scale of the instrument is on the base of the instrument and represents 360° or 180°; the other scale is in the form of an arc, quadrant, or, when the scale on the base represents 360°, preferably a semicircle, capable of being held perpendicular to the scale on the base, and means are provided to enable the ruler to be rotated over the whole length of the scale on either protractor.

The instruments are preferably made from a plastics material, particularly a transparent plastics material, e.g. clear polystyrene, but could also be made from a metal or other material.

Figure 2:
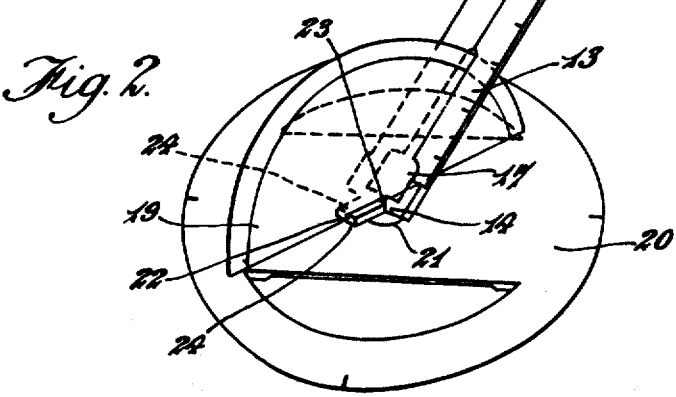
Figure 3:
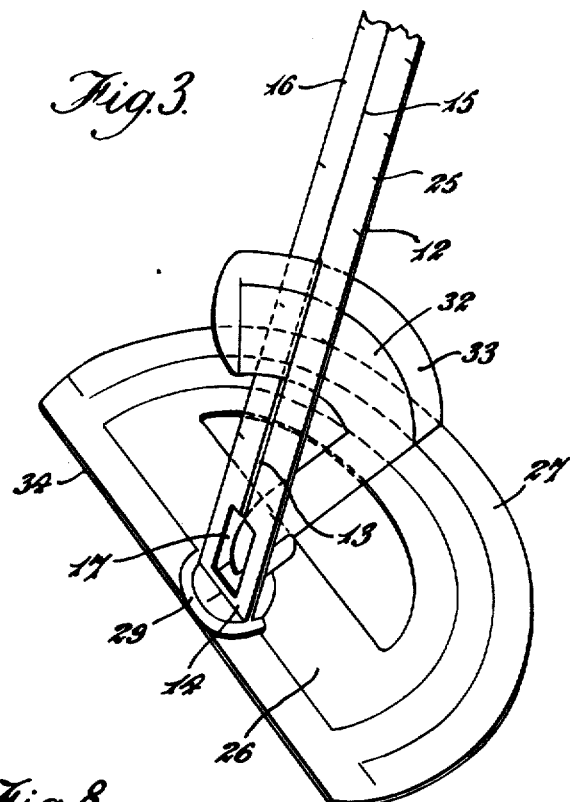
Figure 8:
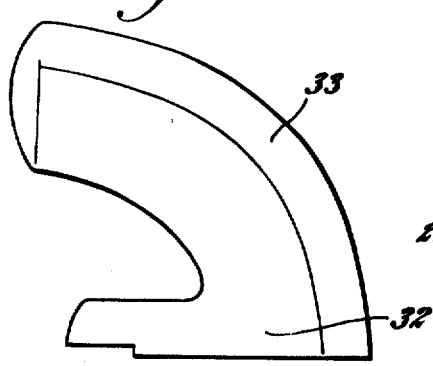
Figure 9:
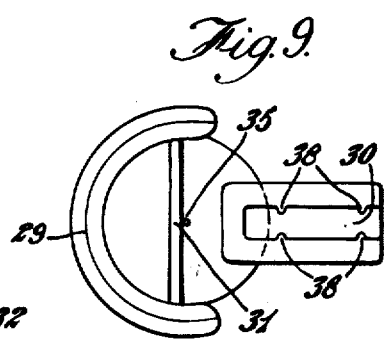

Three particular embodiments of the invention will now be described with reference to the accompanying drawings, in which FIGURE 1 is a perspective view of a first embodiment, FIGURE 2 is a perspective view of a second embodiment, FIGURE 3 is a perspective view of a third embodiment, FIGURE 4 is a plan view of a ruler which forms part of the FIG. 2 embodiment, FIGURE 5 is a plan view of a scale forming part of the second embodiment, FIGURE 6 is a plan view of another scale forming part of the second embodiment, FIGURE 7 is a plan view of a swivel device forming part of the second embodiment, FIGURE 8 is a plan view of a scale forming part of the third embodiment, and FIGURE 9 is a plan view of a swivel device forming part of the third embodiment.

DETAILED DESCRIPTION

Referring first to the embodiment shown in FIGURE 1, a base protractor 1, having a straight edge 11, is provided with a scale 2. Another protractor having scale 3 is hinged to the base 1 at 8. The scales 2 and 3 are marked off from 0° to 90° in both directions starting from the hinge 8. The base 1 is also provided with a swivel device 4 which is rotatable in the plane of the base about the point 9 where the axes of the two scales 2 and 3 intersect in a plane parallel to the base 1. The swivel device 4 has a slot 6.

A ruler 5 is provided with a slit 7 just large enough for the scale 3 to pass through so that the ruler 5 may be slid over the scale 3.

The ruler 5 is also provided with a central line 10 marked off in inches from the end of the ruler 5 in the slot 6. The end of the ruler 5 in the slot 6 is rounded off so that the ruler, and consequently the line 10, can be rotated about the end containing the point 9. One of the edges of the ruler 5 is also marked off in inches.

In FIG. 4 a ruler 12 is provided with a hole 17, a slit 13, an end piece 14 of circular cross-section, a central line 15, a scale 16 marked off in units of length e.g. inches or centimetres and, if desired, a scale 25 marked off in the same or different units of length. The edges of the ruler 12, with the exception of the end piece 14, are tapered. The ruler 12 is also provided with a local recess 36. Ruler 12 forms part of the embodiment of FIG. 2, as will be hereinafter described.

When the instrument is not in use the ruler 5 may be detached and the scale 3 folded so that it lies in the same plane as the base. This facilitates packing and transportation.

To measure an angle in a plane perpendicular to the base 1, the scale 3 is kept perpendicular to the scale 2 and the ruler 5 is slid over the scale 3 until the angle between the ruler 5 and the base 1 is equal to the angle being measured. The angle can then be read off the scale 3. If desired an angle in the plane of the base 1 may be read simultaneously. Distances from the point 9 e.g. the lengths of sides of triangles can be read off the scale on the ruler.

To measure an angle in the plane of the base 1, the ruler is detached and the scale 2 is used in the same way as an ordinary two-dimensional protractor. If it is desired to measure angles from 90° to 180° the scale 3 can be folded flat against the base 1 in which case it forms a continuation of scale 2. Once the scale 3 has been folded flat the ruler 5 can be inserted in the slot 6 and rotated in the plane of the base 1 in order to measure angles in the plane of the base 1.

When the ruler is detached it can be used in the usual manner for measuring distances.

The instrument can also be used as a height measuring device when the ruler 5 is held in the slot 6 perpendicular to the base 1.

Alternatively, if the distance from the point 9 on the instrument to an object is known, the angle that the top of the object makes at the point 9 with the base 1 when the base 1 is horizontal may be measured by rotating the ruler 5 about the scale 3. For such measurements the ruler 5 is preferably provided with two projections (not shown) on its central line 10. By rotating the ruler 5 these projections can be brought into alignment and the angle made with the scale 3 by the ruler 5 measured. The height of the object can then be calculated from the tangent of the angle formed. For smaller objects the hypotenuse of the triangle formed by the ruler 5, the plane of the base 1, when kept horizontal, and the object can be measured by means of the scale on the ruler 5 and hence the height of the object or the distance from the point 9 of the instrument to the object can be calculated using the sine or cosine of the angle formed respectively. Alternatively if two or more sides of the triangle formed by the plane of the base 1, when kept horizontal, the object and the plane of the ruler, are known the tangent, cosine or sine of the angle made by the ruler 5 with the scale 3 may be calculated.

It is also possible to use the instrument as a T square. In this case the straight edge 11 of the base 1 and the ruler 5 form the two parts of the T square.

Therefore this embodiment of the invention can be used as a combination device comprising a protractor, a ruler, a height measuring device, a T square and devices for measuring tangents, cosines and sines and distances to objects in addition to its use for measuring angles in two mutually perpendicular planes.

Referring next to the embodiment shown in FIGURES 2, 5, 6 and 7, a semicircular protractor 19 has a semicircular cut out 18 at the axis of its scale. A circular protractor 20 is provided with a swivel device comprising a circular turntable 21, which can be rotated in the plane of the protractor 20, and four support members 24 forming two perpendicular slots 22 and 23. The ends of support members 24 adjacent to the slit 23 are tapered inwardly. Each of the support members 24 is provided with a rib 37. The edges of the protractors 19 and 20 are tapered. The two protractors 19 and 20 are used in conjunction with a ruler 12 as described above with reference to FIGURE 4.

To assemble the instrument the end piece 14 of the ruler 12 is inserted in the semicircular cut out 18 of the protractor 19. Part of the protractor 19 is passed through the slit 13. Then the end piece 14 of the ruler 12 is inserted into the slot 23 in the turntable 21 on the circular protractor 20, and simultaneously the protractor 19 is inserted into the slot 22. The tapered ends of the support members 24 help to keep the ruler 12 in slot 23 and the ribs 37 help to keep the protractor 19 in the slot 22.

By rotating the turntable 21, the protractor 19 may be rotated about the protractor 20.

By rotating the ruler 12 about its end 14, when the circular protractor 20 is in the horizontal plane, it is possible to measure angles in the vertical plane. If desired an angle in the horizontal plane may be measured simultaneously. Distances from the axis, e.g. the lengths of sides of triangles can be read off the scale 16 or 25 on the ruler 12. The instrument may also be used for measuring the height of objects. Either the ruler 12 may be held perpendicular to the protractor 20 and the height measured directly, or, if the distance from the axis of the instrument to the object is known the angle that the top of the object makes with the protractor 20 at the axis of the instrument when the protractor 20 is horizontal may be measured by rotating the ruler 12 about the scale on the protractor 19. For such measurements the ruler 12 is preferably provided with at least two projections (not shown) on its central line 15. By rotating the ruler 12 these projections can be brought into alignment and the angle made with the protractor 19 by the ruler 12 measured. The height of the object can then be calculated using the tangent of the angle. For smaller objects the hypotenuse of the triangle formed by the ruler 12, the protractor 20 when held in a horizontal plane, and the object can be measured by means of the scale 16 or 25 on the ruler 12 and hence the height of the object or the distance from the axis of the instrument to the object can be calculated using the sine or cosine of the angle formed respectively. Alternatively if two or more sides of the triangle formed by the protractor 20 when held in a horizontal plane, the object and the plane of the ruler 12 are known, the tangent, cosine or sine of the angle made by the ruler 12 with the protractor 19 may be calculated. To measure angles in one plane only the protractor 20 may be used in conjunction with the ruler 12. The end piece 14 of the ruler 12 is inserted in the slot 23 on the protractor 20 and the ruler 12 may then be rotated in the plane of the protractor 20.

The ruler 12, when detached from the instrument can be used in the normal manner for measuring distances, and protractors 19 and 20 can both be used in the manner of normal protractors.

Therefore this embodiment of the invention can be used as a combination device comprising two protractors, a ruler, and devices for measuring height, distances to objects and tangents, cosines and sines, in addition to its use for measuring angles in two mutually perpendicular planes.

Referring lastly to the embodiment shown in FIGURES 3, 8 and 9, a base protractor 26 has a scale 27 marked off in both directions from 0 to 180°, and a straight edge 34. The base 26 is provided with a swivel device 29 which is rotatable about the axis of the scale 27 and which is shown as being detachable from the base 26. The swivel device 29 is shown in detail in FIGURE 9 and has two slots 30 and 31. Slot 30 is provided with four ribs 38, two on each side of the slot. A quadrant protractor 32 has a scale 33 marked off from 0 to 90°. The shape of this protractor 32 is shown in FIGURE 8. The edges of the protractors may be tapered. The instrument is also provided with a ruler 12 having a hole 17, slit 13, end piece 14, central line 15 and scales 16 and 25 as described above with reference to FIGURE 4.

To assemble the instrument the swivel device 29 is, if necessary, set in position in the base 26, and the quadrant protractor 32 is placed in the slot 30 on the swivel device 29 in such a manner that the axis of each of the scales 27 and 33 passes through the same point 35 at the axis of the swivel device 29. The ribs 38 help to hold the protractor 32 in the slot 30. The end piece 14 of the ruler 12 is then inserted in the slot 31 on the swivel device 29 and the quadrant protractor 32 is partially passed through the slit 13 of the ruler 12.

By rotating the swivel device 29 the protractor 32 may be rotated about the base 26. If desired the portion of the base 26 lying inside the scale 27 may be provided with a groove (not shown) and the protractor 32 may be provided with a protrusion (not shown) at its edge which comes into contact with the base 26 so that when the protrusion is inserted in the groove the quadrant protractor 32 may be rotated about the base 26 without danger of it coming apart from it.

To measure an angle in a plane perpendicular to the base 26, the ruler 12 is slid over the scale 33 until the angle between the ruler 12 is equal to the angle being measured. The angle may then be read off the scale 33. If desired an angle in the plane of the base may be measured simultaneously. Distances from the point 35 e.g. the lengths of sides of triangles can be read off the scale 16 or 25 on the ruler 12.

To measure an angle in the plane of the base 26 only, the quadrant protractor 32 may be removed from the instrument. The ruler 12 may then be rotated in the plane of the base 26 about the point 35. With the quadrant protractor 32 removed the instrument may also be used as a T square. In this case the straight edge 34 of the base 26 and the ruler 12 form the two parts of the T square. When detached from the instrument, each of the protractors 26 and 32 and the ruler 12 may be used independently.

The instrument may also be used for measuring the height of objects. Either the ruler 12 may be held perpendicular to the base 26 when the base 26 is horizontal and the height measured directly, or, if the distance from the axis 35 of the instrument to the object is known, the angle that the top of the object makes with the base 26, when the base 26 is horizontal, at the axis 35 of the instrument may be measured by rotating the ruler 12 about the scale 33 on the protractor 32. For such measurements the ruler 12 is preferably provided with at least two projections (not shown) on its central line 15. By rotating the ruler 12 these projections can be brought into alignment and the angle made with the protractor 32 by the ruler 12 measured. The height of the object can then be calculated using the tangent of the angle formed. For smaller objects the hypotenuse of the triangle formed by the ruler 12, the base 26, when held in a horizontal plane, and the object can be measured by means of the scale 16 or 25 on the ruler 12, and hence the height of the object or the distance from the axis 35 of the instrument to the object can be calculated using the sine or cosine of the angle formed respectively. Alternatively if two or more sides of the triangle formed by the base 26, when held in a horizontal plane, the object and the plane of the ruler 12 are known, the tangent, cosine or sine of the angle made by the ruler 12 with the protractor 32 may be calculated.

Therefore this embodiment of the invention can be used as a combination device comprising two protractors, a T square, a ruler and devices for measuring height, distances to objects and tangents, cosines and sines, in addition to its use for measuring angles in two mutually perpendicular planes.

Each of the instruments described above with reference to the drawings is made from a transparent plastics material, preferably from clear polystyrene.

What I claim is:

1. A goniometer for measuring angles in two mutually perpendicular planes, comprising first and second flat calibrated protractors having a common center, turntable means mounted on said first protractor for rotation relative thereto, said turntable means being formed with a first slot for receiving said second protractor, a ruler, said turntable means being formed with a second slot for attaching one end of said ruler thereto, said ruler being slotted longitudinally so that the ruler is circumjacent to said second protractor, said one end of the ruler being shaped to facilitate rotation of the ruler about the common center of said protractors and over the calibrated surface of said second protractor.

2. A goniometer as claimed in claim 1, in which said turntable is slotted in such a manner that the angle between the protractors is maintained at a constant value of 90°.

3. A goniometer as claimed in claim 1, in which said end of the ruler at the common center is shaped to facilitate rotation of the ruler, and said turntable is slotted complementarily.

References Cited

UNITED STATES PATENTS

| 945,684 | 11/1910 | Blair | 33—90 |
|---|---|---|---|
| 2,636,270 | 4/1953 | McDonald | 33—90 X |
| 3,066,415 | 12/1962 | Jefferson. | |

FOREIGN PATENTS

| 36,889 | 9/1886 | Germany. |
|---|---|---|
| 2.326 | of 1915 | Great Britain. |

HARRY N. HAROIAN, Primary Examiner